United States Patent

[11] 3,619,642

[72] Inventor Roger S. Dunn
Dallas, Tex.
[21] Appl. No. 875,866
[22] Filed Nov. 12, 1969
[45] Patented Nov. 9, 1971
[73] Assignee Texas Instruments Incorporated
Dallas, Tex.

[54] MULTIPHASE BINARY SHIFT REGISTER

8 Claims, 12 Drawing Figs.

[52] U.S. Cl. .......... 307/221, 307/208, 307/238, 307/279, 307/289, 340/173
[51] Int. Cl. .......... G11c 19/00
[50] Field of Search .......... 307/221 C, 221, 208, 205, 238, 246, 251, 279, 289, 304; 328/37; 340/173

[56] References Cited

UNITED STATES PATENTS 3,322,974 5/1967 Ahrons et al. .......... 307/221 CL X
3,395,292 7/1968 Bogert .......... 307/279 X
3,480,796 11/1969 Polkinghorn et al. .......... 307/304 X
3,483,400 12/1969 Washizuka et al. .......... 307/279
3,524,077 8/1970 Kaufman .......... 307/246

*Primary Examiner*—Stanley T. Krawczewicz
*Attorneys*—James O. Dixon, Andrew M. Hassell, Melvin Sharp, John E. Vandigriff, Henry T. Olson and Michael A. Sileo, Jr.

ABSTRACT: A high stability, binary data, multiphase shift register of at least three phases, stores and shifts "N" bits of binary information in approximately (N×*n*)/(*n*−1) binary switches, where *n* is the number of phases utilized in the register, and N is the maximum number of bits capable of being stored in the shift register at all times during its operation. The binary switches are connected in series and each is then selectively connected to one of the *n* phases.

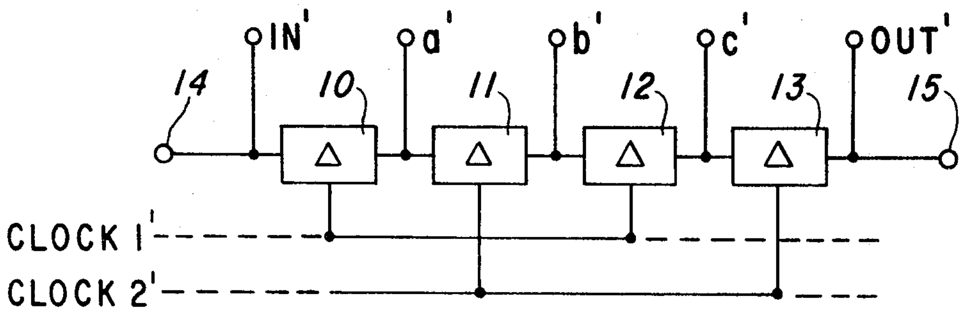

Fig. 1
(PRIOR ART)

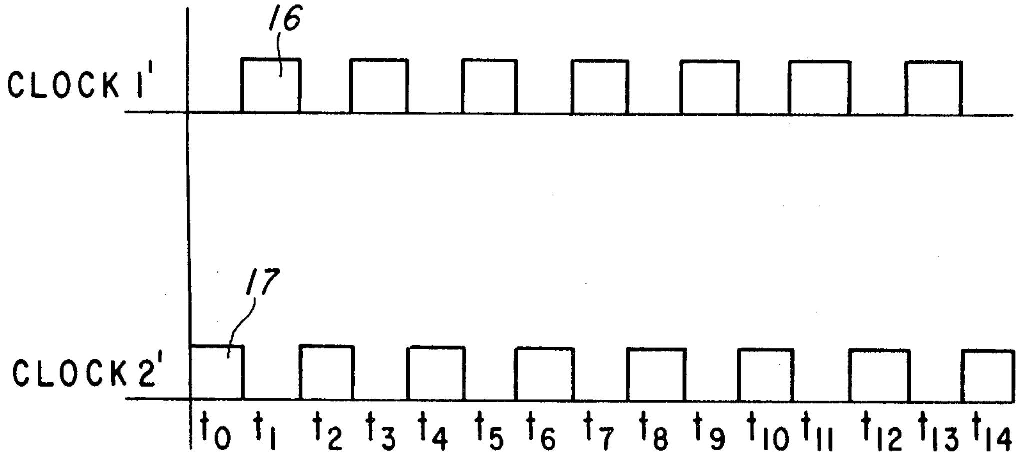

Fig. 2
(PRIOR ART)

| | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ |
|---|---|---|---|---|---|---|---|---|---|---|---|---|---|---|---|
| IN' | $\phi$ | A | $\phi$ | B | $\phi$ | C | $\phi$ | D | $\phi$ | E | $\phi$ | F | $\phi$ | G | $\phi$ |
| a' | X | $\phi$ | A | $\phi$ | B | $\phi$ | C | $\phi$ | D | $\phi$ | E | $\phi$ | F | $\phi$ | G |
| b' | $\phi$ | X | $\phi$ | A | $\phi$ | B | $\phi$ | C | $\phi$ | D | $\phi$ | E | $\phi$ | F | $\phi$ |
| c' | Y | $\phi$ | X | $\phi$ | A | $\phi$ | B | $\phi$ | C | $\phi$ | D | $\phi$ | E | $\phi$ | F |
| OUT' | $\phi$ | Y | $\phi$ | X | $\phi$ | A | $\phi$ | B | $\phi$ | C | $\phi$ | D | $\phi$ | E | $\phi$ |

Fig. 3
(PRIOR ART)

INVENTOR
ROGER S. DUNN

BY Henry T. Olsen
ATTORNEY

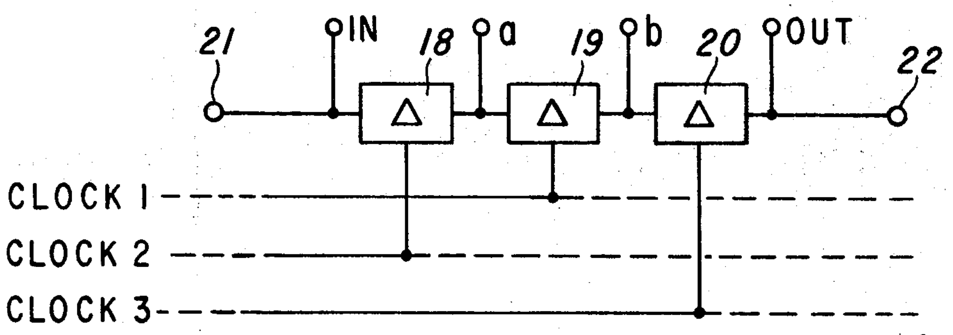
Fig. 4
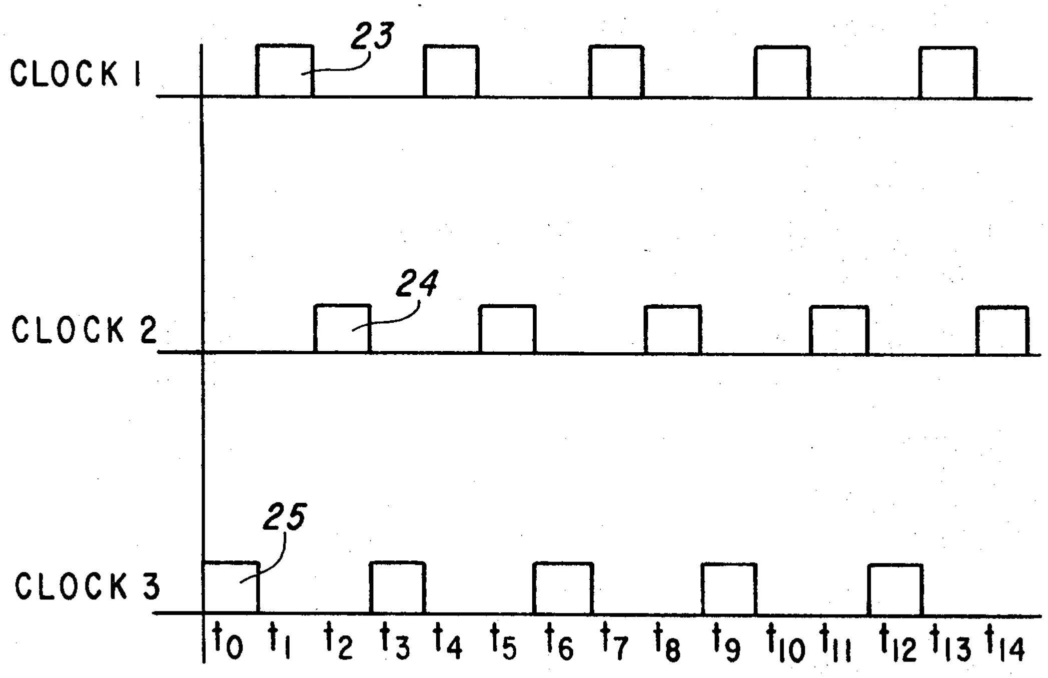
Fig. 5
| | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ |
|---|---|---|---|---|---|---|---|---|---|---|---|---|---|---|---|
| IN | $\phi$ | A | A | $\phi$ | B | B | $\phi$ | C | C | $\phi$ | D | D | $\phi$ | E | E |
| a | X | X | $\phi$ | A | A | $\phi$ | B | B | $\phi$ | C | C | $\phi$ | D | D | $\phi$ |
| b | Y | $\phi$ | X | X | $\phi$ | A | A | $\phi$ | B | B | $\phi$ | C | C | $\phi$ | D |
| OUT | $\phi$ | Y | Y | $\phi$ | X | X | $\phi$ | A | A | $\phi$ | B | B | $\phi$ | C | C |
Fig. 6

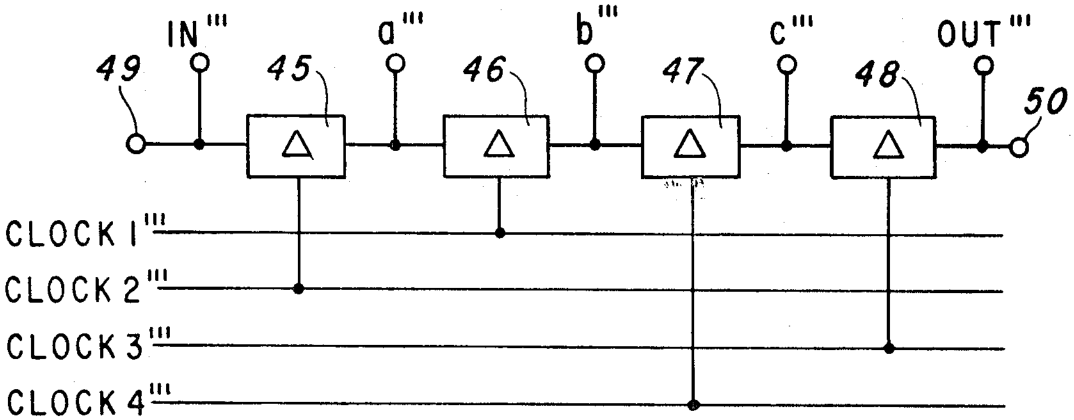
Fig. 10
Fig. 11
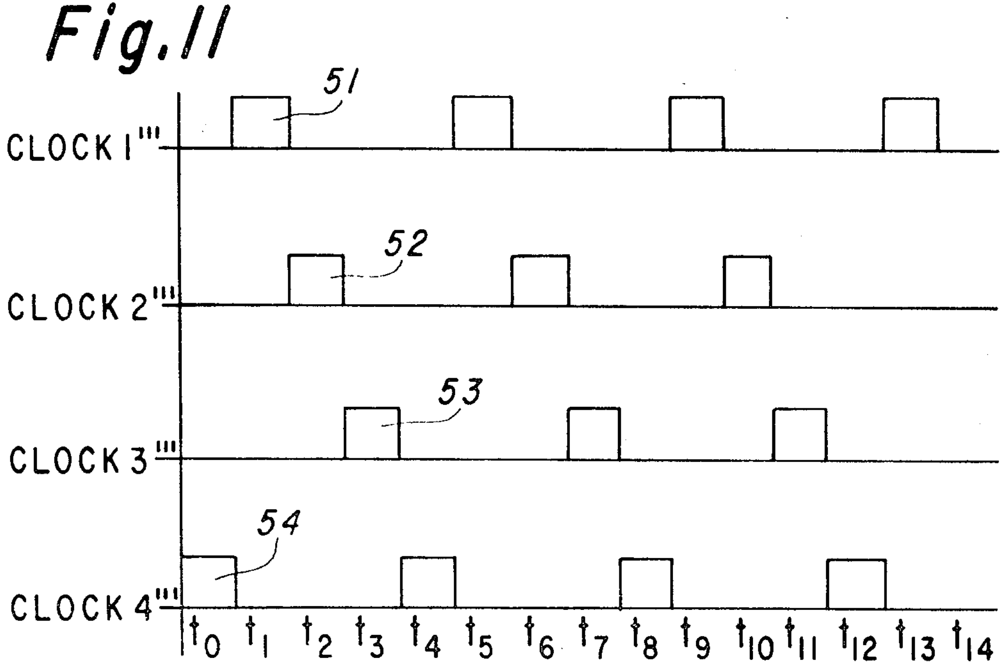
Fig. 12
| | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ |
|---|---|---|---|---|---|---|---|---|---|---|---|---|---|---|---|
| IN''' | A | A | A | $\phi$ | B | B | B | $\phi$ | C | C | C | $\phi$ | D | D | D |
| a''' | X | X | $\phi$ | A | A | A | $\phi$ | B | B | B | $\phi$ | C | C | C | $\phi$ |
| b''' | Y | $\phi$ | X | X | X | $\phi$ | A | A | A | $\phi$ | B | B | B | $\phi$ | C |
| c''' | $\phi$ | Y | Y | Y | $\phi$ | X | X | X | $\phi$ | A | A | A | $\phi$ | B | B |
| OUT''' | Z | Z | Z | $\phi$ | Y | Y | Y | $\phi$ | X | X | X | $\phi$ | A | A | A |

MULTIPHASE BINARY SHIFT REGISTER

This invention relates generally to shift registers wherein binary data is stored and shifted, and more particularly, to shift registers operated by electrical pulses of three or more phases.

A digital shift register is a circuit in which a plurality of binary storage units are connected in series to form a chain. Digital information introduced into a binary switch at one end of the chain is propagated through the chain by successively applying clock pulses to alternate ones of the binary switches in the chain. Propagation occurs because the information is successively passed from one of the binary switches to the next succeeding binary switch until it reaches the other end of the chain.

There are many instances in the computer and semiconductor industries where it is desirable to store and shift a large number of bits of binary data, or information, while keeping to a minimum the number of binary switches necessary to perform such operation. In both the computer and semiconductor industries, physical space requirements, operating power requirements and circuit heat dissipation are among prime considerations. In a computer comprised of semiconductor integrated circuits, for example, it is often desirable to fabricate an integrated circuit shift register with maximum storage capacity in the limited space available on a slice of semiconductor material, while keeping the required operating or clock drive power down to a minimum. In addition, the heat dissipation must be low enough to prevent damage to the integrated circuit when it is placed in the thermal environment of the computer.

According to the present invention, an equal number of bits of binary information is stored in fewer binary switches than is required by conventional shift registers. Such reduction in the number of binary switches results in both a saving of space and of clock drive power per bit of stored information. Since clock drive power per bit is reduced, power or heat dissipation is proportionately reduced. Thus, the present invention is embodied, by way of example, in an integrated circuit shift register which, while having the same number of binary switches as a conventional shift register, has the capacity of storing and shifting $2(n-1)/n$ times the number of bits such conventional shift register has the capacity of storing and shifting, where $n$ represents the number of different phases of electrical pulses utilized in a particular embodiment of the invention, the number of different phases being at least three. In another embodiment, by way of a second example, a shift register of the invention stores N bits of binary information in $\simeq[n/(n-1)]N$ binary switches while a prior art shift register requires 2N binary switches to store an equivalent number of bits of binary information, where N represents the total number of bits which the particular embodiment is capable of storing at all times during its operation and the mathematical symbol for "approximately"d ($\simeq$) is defined, as used herein, to mean that if the value of the expression in front of which it appears is not an integer, the value of the expression is rounded out to the closest higher integer. Thus, for example, since the number of binary switches required in a particular embodiment of the invention is represented by the expression $\simeq[(N\times n)/(n-)]$, the value of the expression must be a whole number (there being no operational fractional part of a binary switch) and a whole switch is substituted for any fractional part thereof. While the number of binary switches required in a three-phase shift register of the invention, capable of storing and shifting nine bits of binary information, as represented by the above expression would be approximately 27/2, in such embodiment 14 switches would actually be required.

It is therefore an object of the invention to provide a multiphase shift register of at least three phases.

Another object of the invention is to provide a shift register for storing and shifting a maximum number of bits of binary information in a minimum number of binary switches.

A further object of the invention is to provide a shift register for storing and shifting N bits of binary information in approximately $(N\times n)/(n-1)$ binary switches.

Still another object of the invention is to provide a shift register which requires a minimum amount of clock drive power.

The objects of the invention are achieved in accordance with an embodiment of the invention wherein $\sim(N\times n)/(n-1)$ binary switches are provided to store and shift N bits of binary information. Digital clock means for producing electrical pulses of $n$ different phases, where $n$ is at least three, is also provided. The binary switches are electrically connected in series, and each $n$th switch is electrically connected to one of the $n$ different phases, whereby every $n$binary switch is operated per phase.

Other objects and advantages of the invention will be apparent from the detailed description and claims and from the accompanying drawings illustrative of the invention, wherein:

FIGS. 1–3 illustrate an embodiment of a z-bit stage of a prior art master-slave binary data shift register;

FIGS. 4–6 illustrate an embodiment of a 2-bit stage of a three-phase binary data shift register of the invention;

FIGS. 10–12 illustrate an embodiment of a —bit section of a four-phase binary data shift register of the invention.

Figures 7, 8, 9:
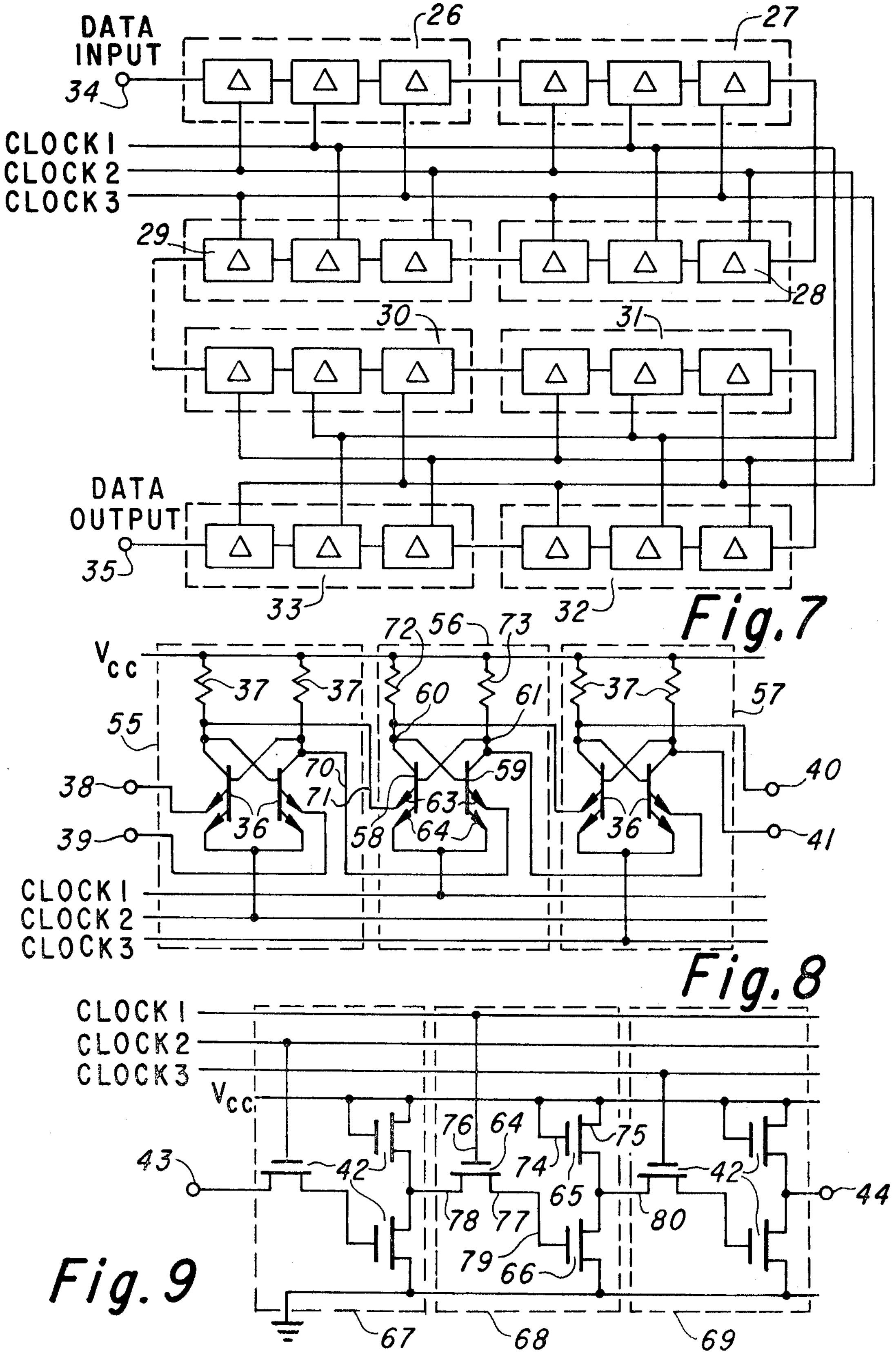
FIG. 7 illustrates an embodiment of an "N"-bit three-phase binary data shift register of the invention.
FIG. 8 illustrates a bistable transistor-transistor logic embodiment of a 2-bit stage of a three-phase shift register of the invention.
FIG. 9 illustrates a metal-insulator-semiconductor field effect transistor embodiment of a 2-bit stage of a three-phase shift register of the invention.

Referring to the drawings, the circuit illustrated in FIG. 1 represents a 2-bit stage of a prior art master-slave binary data shift register. Four binary switches 10, 11, 12 and 13 characterized by the symbol "Δ" are electrically connected in series. The input 14 to the first binary switch 10, is connected to either a source providing input data to the circuit or the output of a previous 2-bit stage, neither of which is shown. The output 15 of the last binary switch 13, is either connected to the input of a next 2-bit stage or becomes the circuit output. The terminals IN′, $a'$, $b'$, $c'$ and OUT′ are points at which the information stored in the circuit at any particular time may be described and have been inserted for the purpose of illustration only.

Every second binary switch beginning with the first (10 and 12), is electrically connected to the first phase (clock 1′) of clock means for producing electrical pulses of two different phases. Every second binary switch beginning with the second (11 and 13), is electrically connected to the second phase (clock 2′).

The electrical pulses 16 and 17 of two different phases (clock 1′ and clock 2′) produced by clock means, are illustrated in FIG. 2 for 15 consecutive time periods $t_0$ to $t_{14}$.

The operation of the 2-bit stage of a prior art binary data shift register is illustrated in FIG. 3 for time periods $t_0$ to $t_{14}$. The symbol Φ represents a state of flux or change during at least part of a particular time period at one of the terminals IN′, $a'$, $b'$, $c'$ or OUT′. The symbols X, Y, A, B, C, D, E, F, and G represent binary data or information appearing at the input to, or output from, a binary switch. The movement of this binary data through the shift register during time periods $t_0$ to $t_{14}$, as detected at terminals IN′, $a'$, $b'$, $c'$ and OUT′, is shown on the chart constituting FIG. 3 as follows:

At time period $t_0$ an electrical pulse from the second phase (clock 2′) operates the second binary switch 11 and the fourth binary switch 13 (shown in FIG. 1). While these binary switches are being operated, the information detected at terminals $b'$ and OUT′ are in a state of flux and binary information X and Y are detected at terminals $a'$ and $c'$ respectively. During the next time period $t_1$, the first binary switch 10 and the third binary switch 12 (both shown in FIG. 1) are operated by an electrical pulse from the first phase (clock 1′), thereby placing the information detected at terminals $a'$ and $c'$ in a state of flux. Binary switches 11 and 13 (seen in FIG. 1) being unoperated during this time period, information X and Y are detected at terminals $b'$ and OUT' respectively. Information A is waiting at the stage's input 14 (shown in FIG. 1). During time period $t_2$, an electrical pulse from clock 2' once again operates binary switches 11 and 13 (seen in FIG. 1), thereby placing the information detected at terminals $b'$ and OUT' in a state of flux. Information A appears at terminal $a'$ and information X appears at terminal $c'$. By following the chart of FIG. 3 through the remaining time periods, $t_3$ to $t_{14}$, it can be observed how binary information B, C, D, and E are shifted through the register from the time that such information appears at the stage's input 14 (shown in FIG. 1) as detected at the IN' terminal until it appears at the stage's output 15 (shown in FIG. 1) as detected at the OUT' terminal.

It should be observed in particular that since the outputs of at least two binary switches are in a state of flux during each time period, only two out of the four binary switches are storing information during all time periods. Therefore, this prior art circuit, often referred to as a master-slave configuration, is capable of storing only 2-bits of binary data per four binary switches.

An embodiment of a 2-bit stage of a three-phase shift register of the present invention, as illustrated in FIG. 4, requires only three binary switches to store and shift the same 2-bits of binary data. Referring to FIG. 4, three binary switches 18, 19, and 20 are connected in series. The stage's input 21 is connected to either a source providing input data to the circuit or the output of a previous 2-bit stage. The output 22 of the stage is either connected to the input of a next 2-bit stage or becomes the circuit output. The terminals IN, $a$, $b$, and OUT are points of reference for the purpose of illustration.

In the three-phase circuit configuration, the second binary switch 19 is electrically connected to the first phase (clock 1), the first binary switch 18 is electrically connected to the second phase (clock 2) and the third binary switch 20 is electrically connected to the third phase (clock 3). Although one stage is illustrated in FIG. 4, other stages, if any, preceding or following it will respectively have their second binary switch connected to the first phase (clock 1), first switch connected to the second phase (clock 2) and third switch connected to the third phase (clock 3).

FIG. 5 illustrates the electrical pulses 23, 24 and 25 of three phases (clock 1, clock 2 and clock 3, respectively) produced by clock means during 15 consecutive time periods $t_0$ to $t_{14}$, whereby the binary switches of the three-phase register of the invention are operated.

The operation of the 2-bit stage of the three-phase binary data shift register of this invention is illustrated on the chart shown in FIG. 6. The movement of binary data X, Y, A, B, C, D, and E through the register during time periods $t_0$ to $t_{14}$, as detected at terminals IN, $a$, $b$, and OUT, is shown on the chart as follows:

At time period $t_0$, an electrical pulse from the third phase (clock 3) operates the third binary switch 20 (shown in FIG. 4). During the operation of this switch, the information detected at terminal OUT is in a state of flux and binary information X and Y are detected at terminals $a$ and $b$ respectively. During time period $t_1$, the second binary switch 19 (shown in FIG. 4) is operated by an electrical pulse from the first phase (clock 1) and the information detected at terminal $b$ is in a state of flux. The data detected at the OUT terminal, having changed during time period $t_0$, is now information Y, while the data detected at terminal $a$ remains information X. During the next time period $t_2$, an electrical pulse from the second phase (clock 2) operates the first binary switch 18 (shown in FIG. 4). The output of said first switch, detected at terminal $a$ is in a state of flux. The second binary switch 19 (shown in FIG. 4) has not stabilized, and information X is detected at terminal $b$. Information Y remains detected at terminal OUT during this time period. The third binary switch 20 (shown in FIG. 4) is again operated by an electrical pulse from the third phase (clock 3) during time period $t_3$. While the information detected at the OUT terminal is in a state of flux, the data now detected at terminal $a$ is information A and information X remains detected at terminal $b$. At time period $t_4$, the third switch 20 (shown in FIG. 4) has stabilized and information X appears at the stage's output 22 (shown in FIG. 4) as detected at the OUT terminal. By following the chart of FIG. 6 through the remaining time periods, $t_5$ to $t_{14}$, it can be observed how binary information B and C are shifted through the register from the time that such information appears at the stage's input 21 (shown in FIG. 4) as detected at the IN terminal, until it appears at the stage's output 22 (shown in FIG. 4) as detected at the OUT terminal.

An N-bit three-phase shift register embodiment of this invention is fabricated by connecting N/2 2-bit three-phase shift register stages (illustrated in FIG. 4) in series. Such an embodiment is illustrated in FIG. 7, in which a first 2-bit three-phase shift register stage 26 is connected to a second stage 27, said second stage is connected to a third stage 28, said third stage is connected to a fourth stage 29 and so forth. The (N–6)/2th stage 30 is connected to the (N–4)/2th stage 31, said (N–4)/2th stage is connected to the (N–2)th stage 32 and finally said (N–2)th stage is connected to the N/2th stage 33.

The second binary switch of each of said stages is electrically connected to a first phase (clock 1) of clock means for producing electrical pulses of three different phases. The first binary switch of each stage is electrically connected to the second phase (clock 2) and the third binary switch of each stage is electrically connected to the third phase (clock 3). The information to be stored and shifted is clocked into the data input terminal 34 and will appear at the output terminal 35, 4N time periods later.

The circuit illustrated in FIG. 8 is a bistable flip-flop, transistor-transistor logic embodiment of a 2-bit stage of a three-phase shift register of the invention (illustrated in FIG. 4). In this particular embodiment, six dual-emitter transistors 36 and load resistors 37 are electrically interconnected to form three bistable flip-flops 55, 56 and 57 in series. The means electrically connecting the three flip-flops in series comprises two conductors 70 and 71, for example, so that both the binary information and its compliment may be transmitted from one flip-flop to the next flip-flop during the operation of the register. Each of the three bistables 55, 56 and 57 is connected to one of the three different phases (clock 2, clock 1 and clock 3, respectively) as shown. The electrical pulses of the three phases which operate the register are the same as those shown in FIG. 5.

The two dual-emitter transistors 58 and 59 comprising each bistable 56, for example, are interconnected in a cross-coupled configuration with a bias voltage Vcc applied to the collectors of each, 60 and 61, through resistors 72 and 73 respectively. One of the transistors is conducting while the other is nonconducting, depending on the last state of the preceding bistable 55. If a first transistor 58, for example, is nonconducting, the current at its collector 60 biases the second cross-coupled transistor 59 and continues driving it in a state of conduction. Since the second transistor 59 is in a state of conduction, the entire current at its collector 61 flows through said second transistor 59 and no current is available to bias the first transistor 58. Hence, the first transistor 58 remains nonconducting and the bistable 56 is in a stable condition. The current at the collector 60 of the first transistor 58 will also be transmitted to the next bistable 57.

The dual emitters 63 and 64 provide an AND-gate for each of the transistors. One of the two conductors 70 or 71 from the preceding bistable 55 will have a current on it. If the second conductor 70 has a current on it and a pulse is transmitted from the first phase (clock 1) nothing will happen to the bistable 56 since the second transistor is already conducting. If however, the first conductor 71 from the preceding bistable 55 has a current on it and a pulse is transmitted from the first phase (clock 1), a disturbance is introduced to start the conduction of the first transistor 58. When the first transistor 58 begins conducting, the entire current at its collector 60 flows through said first transistor 58 and current is no longer available to bias the second transistor 59. Since the second transistor is no longer conducting however, there is enough current available at its collector 61 to bias the first transistor and continue driving it in a stable state of conduction when the pulse from the first phase (clock 1) is no longer being transmitted. The current at the collector 61 of the second transistor 59 is also transmitted to the next bistable 57.

Information is transmitted from one bistable to the next in the same manner described above for the 2-bit stage of the three-phase shift register illustrated in FIG. 4. Binary information and its compliment are clocked into the input terminals 38 and 39 and eight time periods later both the binary information and its compliment appear at the stage's output terminals 40 and 41.

A metal-insulator-semiconductor field effect transistor embodiment of a 2-bit stage of a three-phase shift register of the invention (illustrated in FIG. 4) is illustrated in FIG. 9. Nine metal-insulator-semiconductor (such as metal-oxide-semiconductor or metal-nitride-semiconductor) field effect transistors 42 are interconnected to form three delay switches 67, 68 and 69 in series. Each of said delay switches, biased by voltage Vcc, is selectively connected to one of three different phases (clock 1, clock 2 and clock 3). The gate 74 of one of the field effect transistors 65 of each of the delay switches 67, 68 and 69 (delay switch 68 being labeled by way of example) is shorted to the source 75 of the transistor 65 so that the transistor acts as a load resistor for a second field effect transistor 66. The delay switches 67, 68 and 69 utilize the long capacitance charge storage effect of the metal-insulator-semiconductor transistors 42 in the register's operation. Binary information from a previous delay switch 67 is transmitted to the source 78 of the third transistor 64 of the next delay switch 68. A pulse from the first phase (clock 1) on the gate 76 of the third transistor 64 makes the transistor conductive and transfers the binary information from the source 78 to the drain 77 and thereby to the gate of the second transistor 66. If this information is a binary "one," the second transistor 66 becomes conductive and current representing a binary "one," will be transferred to the input 80 of the next delay switch 69 from the bias voltage Vcc across the apparent load resistor 65. If the information is a binary "zero," the second transistor 66 will not become conductive and no current is transmitted to the input 80 of the next delay switch. Although the electrical pulses which operate the delay switches 67, 68 and 69 are short, the second transistors 66 for example, of each of these delay switches retains its charge long enough to pass the binary information stored therein to the next binary switch in the series. Information is transmitted from one delay switch to the next in the same manner described above for the 2-bit stage of the three-phase shift register illustrated in FIG. 4. Binary information, clocked into the stages input 43 appears at the stage's output 44 eight time periods later.

Illustrated in FIG. 10 is an embodiment of a 3-bit stage of a four-phase shift register according to the invention. In accordance with this embodiment, four binary switches 45, 46, 47 and 48 are electrically connected in series. The input 49 of the first binary switch 45 forms the stage's input, and the output 50 of the last binary switch 48 forms the output of the stage. This stage may be utilized alone or in series with many other identical stages to store and shift the required number of bits of binary data (N bits). Terminals IN''', a''', b''', c''' and OUT''' are points of reference for purpose of illustration only.

Clock means are utilized for producing electrical pulses of four different phases. The second binary switch 46 is electrically connected to the first of said different phases (clock 1'''), the first binary switch 45 is connected to the second phase (clock 2'''), the fourth binary switch 48 is connected to the third phase (clock 3''') and finally the third binary switch 47 is connected to the fourth phase (clock 4'''). These electrical pulses 51, 52, 53, and 54 of the four different phases (clock 1''', clock 2'''clock 3''' and clock 4''', respectively) are illustrated in FIG. 11 over 15 consecutive time periods $t_0$ to $t_{14}$.

The operation of the 3-bit stage of the four-phase shift register during time periods $t_0$ to $t_{14}$ is illustrated in FIG. 12. The movement of binary data X, Y, Z, A, B, C, and D through the register, as detected at reference terminals IN''', a''', b''', c''' and OUT''' is shown on the chart as follows:

At time period $t_0$ an electrical pulse from the fourth phase (clock 4''') operates the third binary switch 47 (shown in FIG. 10). During the operation of this switch, the information detected at terminal c''' is in a state of change and binary information X, Y and Z are detected at terminals a''', b''' and OUT''', respectively. During time period $t_1$ the second binary switch 46 (shown in FIG. 10) is operated by an electrical pulse from the first phase (clock 1''') and the information detected at terminal b''' is in a state of flux. The data detected at terminal c''', having changed during time period $t_0$, is now information Y, while the data detected at terminals a''' and OUT''' remain information X and Z respectively. During the next time period $t_2$ an electrical pulse from the second phase (clock 2''') operates the first binary switch 45 (shown in FIG. 10). The output of said first switch, detected at terminal a''' is in a state of flux. The second switch 46 (shown in FIG. 10) has now stabilized and information X is detected at terminal b'''. Information Y remains detected at terminal c''' and information Z remains detected at the OUT''' terminal during this time period. The fourth binary switch 48 (shown in FIG. 10) is operated by an electrical pulse from the third phase (clock 3''') during the time period $t_3$. While the information detected at the OUT''' terminal is in a state of flux, the data now detected at terminal a''' is information A and information X and Y remain detected at terminals b''' and c''' respectively. At time period $t_4$, the fourth switch 48 (shown in FIG. 10) has stabilized and information Y appears at the stage's output 50 (shown in FIG. 101 as detected at the OUT''' terminal. The third binary switch 47, again being operated during this time period, results in another change of the information detected at terminal c'''. Information Y remains detected at the OUT''' terminal and information X remains detected at terminal b'''. By following the chart of FIG. 12 through consecutive time periods $t_0$ to $t_{14}$, one can trace binary information A being shifted through the register from the time that such information appears at the stages input 49 (shown in FIG. 10) as detected at the IN''' terminal, until it appears at the stage's output 50 (shown in FIG. 10) as detected at the OUT''' terminal.

It should be particularly noted with respect to the 3-bit stage of four-phase embodiment of applicant's invention that only one of the four binary switches 45, 46, 47 and 48 is operated during any one time period, while the remaining three binary switches are storing information. Consequently, each 3-bit stage of a four-phase shift register of the present invention stores three bits of binary information at all time periods, while a corresponding stage of a prior art shift register (as illustrated in FIG. 1), having an equal number of binary switches stores only two bits of binary information.

The four-phase embodiment of the invention, as described above, should be distinguished from an embodiment of the prior art shift register, commonly referred to as "four-phase". In such embodiment the binary switches, which are delay switches such as metal-oxide-semiconductor field effect transistor circuits, are connected in series, with each delay switch electrically connected to two of the four phases. While such circuit is not biased by a constant voltage supply, a bias voltage is intermittently supplied by two of the four phases while the other two of the four phases, alone, do the actual shifting of data.

Therefore, similar to a prior art "two-phase" shift register (shown in FIG. 1), a prior art "four-phase" shift register also stores N bits of binary information in 2N binary switches, while applicant's four-phase shift register, described above, stores N bits of binary information in 4/3N binary switches.

Both three and four-phase embodiments of the invention have been described in detail. It should be clearly understood, however, that the invention is not limited in the number of different phases employed except that they be three or more.

The description of specific embodiments contained herein are merely illustrative of the principles underlying the inventive concept. Various modifications of the disclosed embodiments, as well as other embodiments of the invention, will be apparent to persons skilled in the art.

What is claimed is:

1. An N-bit binary data $n$-phase shift register where $n$ is greater than 2, comprising:
   a. means for producing electrical pulses of $n$ different phases;
   b. $\sim(N \times n)/(n-1)$ binary switches connected in series for storing and shifting N bits of binary data; and
   c. means coupling each of $n$ displaced groups of said binary switches selectively to said pulses of $n$ different phases for selectively switching each group of said binary switches in response to pulses of a different respective phase.

2. An N-bit binary data $n$-phase shift register where $n$ is greater than 2, comprising:
   a. means for producing electrical pulses of $n$ different phases;
   b. $\sim(N \times n)/(n-1)$ binary switches connected in series for storing and shifting N bits of binary data; and
   c. means coupling every $n$th binary switch beginning with the first binary switch to pulses of one of said $n$ phases and every $n$th binary switch beginning with the second binary switch progressively through the $n$th binary switch selectively to the pulses of the remaining phases for selectively switching each of $n$ displaced groups of said binary switches in response to pulses of a different respective phase.

3. An N-bit high stability binary data three-phase shift register which comprises:
   clock means for producing electrical pulses of three different phases;
   $\sim 3N/2$ binary switches for storing and shifting N bits of binary data;
   means electrically connecting the binary switches in series;
   means electrically connecting every third binary switch beginning with the second switch to the first phase;
   means electrically connecting every third binary switch beginning with the first switch to the second phase;
   means electrically connecting every third binary switch beginning with the third switch to the third phase.

4. The three-phase shift register described in claim 3 wherein the binary switches are metal-insulator-semiconductor field effect transistor delay switches.

5. The three-phase shift register described in claim 3 wherein the binary switches are bistable flip-flops.

6. An N-bit high stability binary data four-phase shift register which comprises:
   clock means for producing electrical pulses of four different phases;
   $\simeq 4N/3$ binary switches for storing and shifting N bits of binary data;
   electrical means for connecting the switches in series;
   means electrically connecting every fourth binary switch beginning with the second switch to the first phase;
   means electrically connecting every fourth binary switch beginning with the first switch to the second phase;
   means electrically connecting every fourth binary switch beginning with the fourth switch to the third phase; and
   means electrically connecting every fourth binary switch beginning with the third switch to the fourth phase.

7. The four-phase shift register described in claim 6 wherein the binary switches are metal-insulator-semiconductor field effect transistor delay switches.

8. The four-phase shift register described in claim 6 wherein the binary switches are bistable flip-flops.

* * * * *